J. A. LUDLOW.
BOLT AND NUT.
APPLICATION FILED JUNE 16, 1908.
963,783.
Patented July 12, 1910.
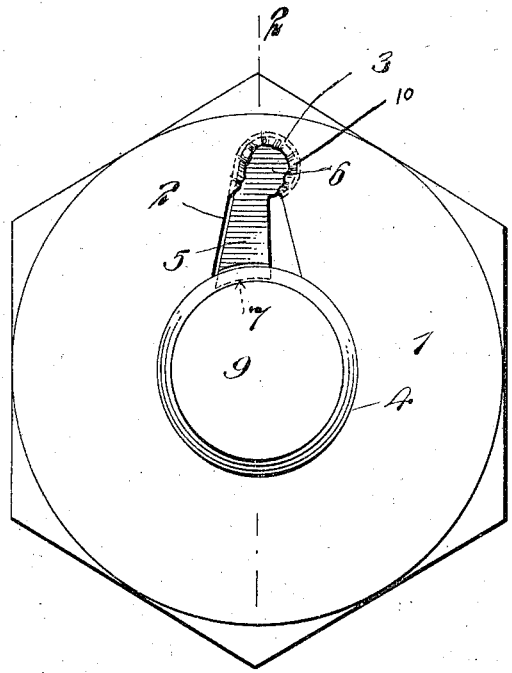
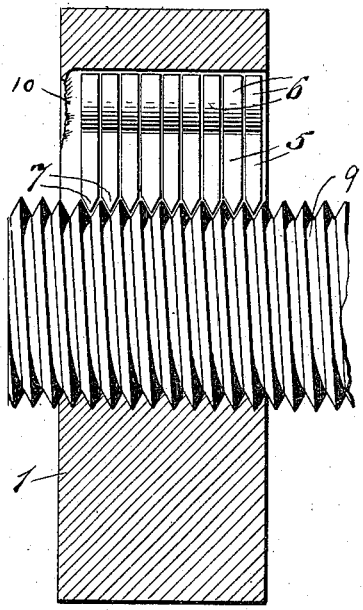
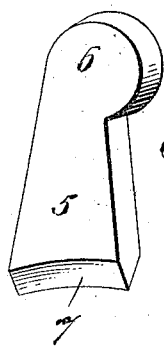
WITNESSES:
INVENTOR
ATTORNEYS

UNITED STATES PATENT OFFICE.

JOSIAH ALONZO LUDLOW, OF PATERSON, NEW JERSEY.

BOLT AND NUT.

963,783.

Specification of Letters Patent.   Patented July 12, 1910.

Application filed June 16, 1908.  Serial No. 438,716.

*To all whom it may concern:*

Be it known that I, JOSIAH ALONZO LUDLOW, a citizen of the United States, residing at Paterson, county of Passaic, and State of New Jersey, have invented certain new and useful Improvements in Bolts and Nuts, of which the following is a specification.

The present invention relates to means for locking screws and bolts in nuts, and consists, essentially, of one or more pawls or detents so arranged with reference to the central orifice in the nut, that a screw or bolt engaging such central orifice will be prevented from reversely rotating therein.

One embodiment of the invention is illustrated in the accompanying drawing, wherein—

Figure 1 is a top plan view of a nut and bolt provided with my invention; Fig. 2 is a vertical sectional view on the line 2—2 of Fig. 1, and Fig. 3 is a perspective view of an individual pawl.

Referring to the drawing 1 indicates an ordinary railroad or lock nut provided as is usual, with a central screw threaded orifice 4 through which a correspondingly screw threaded bolt or screw 9 may be passed. Formed in the nut 1 is an elongated aperture or slot 2 terminating in a substantially circular hole or aperture 3, the apertures 2 and 3 forming one continuous passage eccentric to the central orifice 4. Arranged to have lateral motion in the said passage is a pawl, or a series of pawls, each consisting of a head portion 6 lying within the circular aperture 3, a shank portion 5 extending longitudinally of the slot 2 and an edge 7 which extends slightly beyond the aperture 2 and into engagement with the threads formed on the bolt or screw 9 in the central nut orifice 4. The metal about the edges of the circular aperture 3 is upset at 10 so as to form means for movably retaining the pawls or detents in place.

It is to be understood that I may employ a single pawl formed with one or more edges 7, or I may employ a plurality of such pawls, each provided with a like edge for engaging the threads upon the screw or bolt.

The following is a brief description of the operation of the invention. When a screw or bolt is inserted into the central nut orifice 4 and turned therein in the direction of the threads on the bolt or screw, the pawls are inoperative merely resting against the threads and offering no impediment to the screw's rotation, when however it is attempted to reversely rotate the screw or bolt, the pawls, which are eccentric to the central nut orifice, will engage the screw threads on the bolt or screw and lock the latter, preventing such reverse rotation thereof.

Having thus described my invention, what I claim as new and desire to secure by Letters Patent is:—

1. In a device of the character described, the combination with a nut having a central orifice, of a pivoted pawl arranged eccentrically to said central orifice and consisting of a series of independently movable members.

2. In a device of the character described, the combination with a nut having a central orifice, of a pawl arranged in a cut out portion of the nut, pivoted therein and arranged eccentrically to said central orifice and consisting of a series of independently movable members.

3. In a device of the character described, the combination with a nut having a central orifice and an elongated slot therein, of a pawl movable laterally in said elongated slot and being arranged eccentrically to the said central orifice and consisting of a series of independently movable members.

4. In a device of the character described, the combination with a nut having a central orifice, and arranged eccentrically thereto, an elongated slot terminating in an enlarged substantially circular orifice, of a pawl having a head pivotally arranged in said substantially circular orifice and a shank extending within said elongated slot and adapted to swing therein, the edges of a portion of said orifice being upset to retain said pawl.

5. A nut lock comprising a nut having a double chambered recess with a contracted communication between the chambers and extending outward from the bolt opening, the edge of the recess being adapted to be burred over to prevent the withdrawal of the lock; a lock having a threaded face shaped to conform to the curve of the bolt and pivotally mounted in one of the chambers to swing in the other chamber.

In testimony whereof I affix my signature in presence of two witnesses.

JOSIAH ALONZO LUDLOW.

Witnesses:
ALFRED GARTNER,
WM. J. SCHWEIGER.